United States Patent
Nakamura et al.

(10) Patent No.: US 12,303,833 B2
(45) Date of Patent: May 20, 2025

(54) REVERSE OSMOSIS MEMBRANE TREATMENT SYSTEM AND REVERSE OSMOSIS MEMBRANE TREATMENT METHOD

(71) Applicant: ORGANO CORPORATION, Tokyo (JP)

(72) Inventors: Yuki Nakamura, Tokyo (JP); Akihiro Takada, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 0 days.

(21) Appl. No.: 16/461,946

(22) PCT Filed: Nov. 16, 2017

(86) PCT No.: PCT/JP2017/041313
§ 371 (c)(1),
(2) Date: May 17, 2019

(87) PCT Pub. No.: WO2018/092852
PCT Pub. Date: May 24, 2018

(65) Prior Publication Data
US 2019/0321786 A1    Oct. 24, 2019

(30) Foreign Application Priority Data
Nov. 18, 2016 (JP) .................. 2016-225188

(51) Int. Cl.
*B01D 61/02* (2006.01)
*B01D 61/08* (2006.01)
(Continued)

(52) U.S. Cl.
CPC ......... *B01D 61/026* (2022.08); *B01D 61/025* (2013.01); *B01D 61/08* (2013.01);
(Continued)

(58) Field of Classification Search
CPC .. C02F 1/441; C02F 1/76; C02F 1/766; C02F 2301/08; B01D 2325/28; B01D 71/56;
(Continued)

(56) References Cited

U.S. PATENT DOCUMENTS 5,989,426 A * 11/1999 Hirose ................. B01D 61/022
210/500.38
6,171,497 B1    1/2001 Hirose et al.
(Continued)

FOREIGN PATENT DOCUMENTS

CN    1158274 A    9/1997
CN    1163793 A    11/1997
(Continued)

OTHER PUBLICATIONS

Nitto Hydraunautics, Mebrane element SWC5 Max;Https://www.lenntech.com/applications/index.htm?gclid?gclid=EABlalQobChMl3tzrcDL9AIV2, Dec. 4, 2021.*
(Continued)

*Primary Examiner* — Patrick Orme
(74) *Attorney, Agent, or Firm* — Greenblum & Bernstein, P.L.C.

(57) ABSTRACT

A reverse osmosis membrane treatment system is provided with a first reverse osmosis membrane treatment device wherein water to be treated is passed through a first reverse osmosis membrane to obtain first permeate water and first concentrated water, and at least a second reverse osmosis membrane treatment device, wherein the first permeate water is passed through a second reverse osmosis membrane to obtain second permeate water and second concentrated water. The permeation flux per 1 MPa of effective pressure for the second reverse osmosis membrane is lower than the permeation flux per 1 MPa of effective pressure for the first reverse osmosis membrane, and the permeation flux per 1
(Continued)

MPa of effective pressure for the second reverse osmosis membrane is 0.5 m³/m²/d or less.

8 Claims, 2 Drawing Sheets

(51) Int. Cl.
B01D 67/00 (2006.01)
B01D 69/02 (2006.01)
C02F 1/44 (2023.01)

(52) U.S. Cl.
CPC ......... *B01D 67/0093* (2013.01); *B01D 69/02* (2013.01); *C02F 1/441* (2013.01); *B01D 2325/20* (2013.01); *C02F 2301/08* (2013.01)

(58) Field of Classification Search
CPC .............. B01D 61/025; B01D 2321/16; B01D 2321/168; B01D 2317/025; B01D 2325/30; B01D 61/022; B01D 61/026; B01D 61/08; B01D 67/0093; B01D 69/02; B01D 2311/04; B01D 2311/12; B01D 2317/02; B01D 2325/20
See application file for complete search history.

(56) References Cited

U.S. PATENT DOCUMENTS

| | | | | |
|---|---|---|---|---|
| 2004/0094480 | A1* | 5/2004 | Liberman | B01D 61/022 210/652 |
| 2008/0060999 | A1 | 3/2008 | Musale et al. | |
| 2011/0094963 | A1* | 4/2011 | Tada | C02F 1/56 210/636 |
| 2012/0055875 | A1* | 3/2012 | Lien | B01D 61/58 210/639 |
| 2014/0346111 | A1* | 11/2014 | Oi | B01D 61/025 210/639 |
| 2016/0159671 | A1 | 6/2016 | Ikuno | |
| 2016/0198721 | A1* | 7/2016 | Yoshikawa | C02F 1/766 424/723 |
| 2016/0271565 | A1 | 9/2016 | Liu et al. | |
| 2017/0121190 | A1 | 5/2017 | Ikuno et al. | |
| 2017/0296975 | A1* | 10/2017 | Tatsuhara | B01D 61/027 |

FOREIGN PATENT DOCUMENTS

| | | |
|---|---|---|
| CN | 101723531 A | 6/2010 |
| CN | 203112618 U | 8/2013 |
| CN | 103771641 A | 5/2014 |
| CN | 104209012 A | 12/2014 |
| CN | 104624055 A | 5/2015 |
| CN | 105036444 A | 11/2015 |
| CN | 105392552 A | 3/2016 |
| CN | 105517959 A | 4/2016 |
| JP | 08-206460 A | 8/1996 |
| JP | 10-180243 A | 7/1998 |
| JP | 2001 269544 A | 10/2001 |
| JP | 2001 296544 A | 10/2001 |
| JP | 2003-326259 | 11/2003 |
| JP | 2006-159124 A | 6/2006 |
| JP | 2006-263510 A | 10/2006 |
| JP | 2008-086966 A | 4/2008 |
| JP | 2008-161818 | 7/2008 |
| JP | 2010-150248 | 7/2010 |
| JP | 2012-245439 A | 12/2012 |
| JP | 2015-020131 A | 2/2015 |
| JP | 2015-073923 A | 4/2015 |
| JP | 2015 196113 A | 11/2015 |
| JP | 2016-120457 | 7/2016 |
| JP | 2016-137447 | 8/2016 |
| JP | 2016-155074 A | 9/2016 |
| SG | 11201706491X A | 9/2017 |
| TW | M351870 U | 3/2009 |
| TW | I444337 | 7/2014 |

OTHER PUBLICATIONS

Office Action issued Jun. 30, 2020 in Japanese Patent Application No. 2016-225188, and English language translation thereof.
Notice of Grounds for Rejection issued in Korean Patent Application No. 10-2019-7014013 dated Jun. 26, 2020, and English translation thereof.
International Search Report issued in International Application No. PCT/JP2017/041313, dated Feb. 6, 2018 and English translation thereof.
International Preliminary Report on Patentability issued in International Application No. PCT/JP2017/041313, dated Feb. 6, 2018.
Notice of Grounds for Rejection issued in corresponding Korean Patent Application No. 10-2019-7014013 dated Jan. 28, 2021 and English Translation thereof.
Office Action issued in corresponding Chinese Patent Application No. 201780067202.X dated Jun. 30, 2021, along with English translation thereof.
Science of Ultrapure Water Society of Research of Semiconductor Fundamental Technology, Sep. 11, 1990, Realize Corporation, No. 138-142, pp. 255 26, along with English abstract.
Romembra Mar. 2000, Toray Industries, TSU-272 in Japanese language and Romembra Jun. 2004, Toray Industries, SU-720 in English.
"Membrane Treatment Technology" Popular Edition, Dec. 19, 1998, Fuji Technosystem Corporation, pp. 468 478.
"Food Membrane Technology Guide to using Membrane Technology" Sep. 30, 1999, Kounn Co, Ltd pp. 103 118.
"Development and Application Functional Membranes for Separate", Mar. 25, 2001, CMG Corporation, pp. 101-113.
Chemical Engineering Papers Nov. 20, 2011, the Society of Chemical Engineers, vol. 37, No. 6, pp. 563-569.
Filmtec Membranes, Filmtec SW30-8040 Seawater Reverse Osmosis Element.
Office Action issued in Korean Patent Application No. 10-2019-7014013 dated Aug. 30, 2021, along with English translation thereof.
Office Action issued in Taiwanese Patent Application No. 106139252 dated Sep. 10, 2021, along with English translation thereof.
Summary of Notice of Grounds for Revocation issued in corresponding Japanese Patent Application No. 2021-700606 dated Oct. 5, 2021 with its English excerpt translation thereof.
Summary of Decision of Opposition issued in corresponding Japanese Patent Application No. 2021-700606 dated Feb. 22, 2022 with its English excerpt translation thereof.
Office Action issued in corresponding Taiwanese Patent Application No. 106139252 dated Jul. 15, 2022, along with English Translation thereof.

* cited by examiner

REVERSE OSMOSIS MEMBRANE TREATMENT SYSTEM AND REVERSE OSMOSIS MEMBRANE TREATMENT METHOD

TECHNICAL FIELD

The present invention relates to a reverse osmosis membrane treatment system and a reverse osmosis membrane treatment method.

BACKGROUND

There have been heretofore known a reverse osmosis membrane treatment system and a reverse osmosis membrane treatment method using a reverse osmosis membrane, in which treatment target water such as industrial water or city water is treated with the reverse osmosis membrane to obtain permeated water (treated water) and concentrated water.

It is known that in a reverse osmosis membrane treatment system and a reverse osmosis membrane treatment method for performing treatment with a reverse osmosis membrane as described above, double or more pass reverse osmosis membrane unit which membranes are same are used, and for the purpose of improving water quality, a membrane with a rejection improved by using a rejection improver is used as a second-pass reverse osmosis membrane.

For example, Patent Literature 1 discloses a pure water producing apparatus including a first-pass reverse osmosis membrane device through which treatment target water is passed, and a second-pass reverse osmosis membrane separation device through which permeated water from the first-pass reverse osmosis membrane device is passed, wherein at least the reverse osmosis membrane device in the second pass is provided with a reverse osmosis membrane treated with a rejection improver which is a compound having a polyalkylene glycol chain such as a polyethylene glycol.

However, in the method according to Patent Literature 1, it may be impossible to obtain a sufficient water quality improvement effect.

CITATION LIST

Patent Literature

Patent Literature 1: JP 2008-161818 A

SUMMARY

It is an advantage of the present invention to provide a reverse osmosis membrane treatment system and a reverse osmosis membrane treatment method for performing treatment with double or more pass of reverse osmosis membranes, with which a sufficient water quality improvement effect can be obtained.

The present invention provides a reverse osmosis membrane treatment system comprising: a first reverse osmosis membrane treatment unit for passing treatment target water through a first reverse osmosis membrane to obtain first permeated water and first concentrated water; and at least a second reverse osmosis membrane treatment unit for passing the first permeated water through a second reverse osmosis membrane to obtain second permeated water and second concentrated water, wherein a permeation flux per 1 MPa of effective pressure in the second reverse osmosis membrane is lower than a permeation flux per 1 MPa of effective pressure in the first reverse osmosis membrane, and the permeation flux per 1 MPa of effective pressure in the second reverse osmosis membrane is 0.5 $m^3/m^2/d$ or less.

In the reverse osmosis membrane treatment system, the second reverse osmosis membrane is preferably a membrane modified with an oxidant.

In the reverse osmosis membrane treatment system, the second reverse osmosis membrane is preferably a membrane modified with at least one of a stabilized hypobromous acid composition containing a bromine-based oxidant and a sulfamic acid compound and a stabilized hypochlorous acid composition containing a chlorine-based oxidant and a sulfamic acid compound.

In the reverse osmosis membrane treatment system, the treatment target water preferably contains at least any one of boron and a low-molecular-weight organic substance having a molecular weight of 200 or less.

In addition, the present invention provides a reverse osmosis membrane treatment method comprising: a first reverse osmosis membrane treatment step of passing treatment target water through a first reverse osmosis membrane to obtain first permeated water and first concentrated water; and at least a second reverse osmosis membrane treatment step of passing the first permeated water through a second reverse osmosis membrane to obtain second permeated water and second concentrated water, wherein a permeation flux per 1 MPa of effective pressure in the second reverse osmosis membrane is lower than a permeation flux per 1 MPa of effective pressure in the first reverse osmosis membrane, and the permeation flux per 1 MPa of effective pressure in the second reverse osmosis membrane is 0.5 $m^3/m^2/d$ or less.

In the reverse osmosis membrane treatment method, the second osmosis membrane is preferably a membrane modified with an oxidant.

In the reverse osmosis membrane treatment method, the second reverse osmosis membrane is preferably a membrane modified with at least one of a stabilized hypobromous acid composition containing a bromine-based oxidant and a sulfamic acid compound and a stabilized hypochlorous acid composition containing a chlorine-based oxidant and a sulfamic acid compound.

In the reverse osmosis membrane treatment method, the treatment target water preferably contains at least any one of boron and a low-molecular-weight organic substance having a molecular weight of 200 or less.

In a reverse osmosis membrane treatment system and treatment method for performing treatment with double or more pass of reverse osmosis membranes, a sufficient water quality improvement effect can be obtained.

DESCRIPTION OF EMBODIMENTS

An embodiment of the present invention will be described. This embodiment is one example of carrying out the present invention, and the present invention is not limited to this embodiment.

Figure 1:
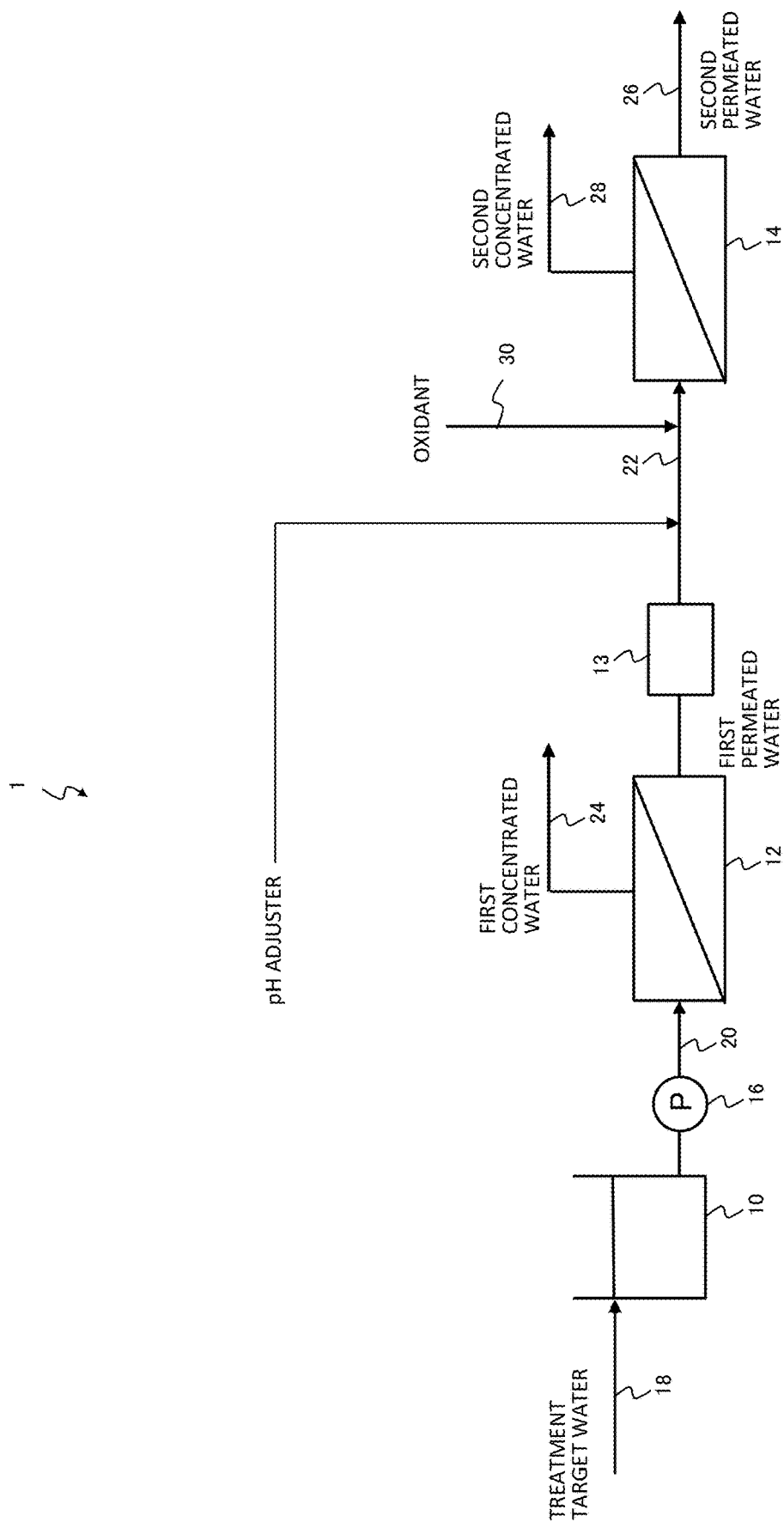
FIG. 1 is a schematic block diagram showing one example of a reverse osmosis membrane treatment system according to an embodiment of the present invention.

One example of a reverse osmosis membrane treatment system according to the embodiment of the present invention is schematically shown in FIG. 1, and a configuration of the reverse osmosis membrane treatment system will be described.

A reverse osmosis membrane treatment system 1 includes a first reverse osmosis membrane treatment device 12 as a first reverse osmosis membrane treatment unit for passing treatment target water through a first reverse osmosis membrane to obtain first permeated water and first concentrated water, and a second reverse osmosis membrane treatment device 14 as a second reverse osmosis membrane treatment unit for passing the first permeated water through a second reverse osmosis membrane to obtain second permeated water and second concentrated water. Here, a permeation flux per 1 MPa of effective pressure in the second reverse osmosis membrane is lower than a permeation flux per 1 MPa of effective pressure in the first reverse osmosis membrane, and the permeation flux per 1 MPa of effective pressure in the second reverse osmosis membrane is 0.5 $m^3/m^2/d$ or less. The reverse osmosis membrane treatment system 1 may include a treatment target water tank 10 for storing treatment target water. A first permeated water tank for storing the first permeated water may be provided between the first reverse osmosis membrane treatment device 12 and the second reverse osmosis membrane treatment device 14.

In the reverse osmosis membrane treatment system 1 in FIG. 1, a treatment target water pipe 18 is connected to an inlet of the treatment target water tank 10, and an outlet of the treatment target water tank 10 and an inlet of the first reverse osmosis membrane treatment device 12 are connected to each other through a pump 16 by a treatment target water supply pipe 20. A first permeated water outlet of the first reverse osmosis membrane treatment device 12 and an inlet of the second reverse osmosis membrane treatment device 14 are connected to each other by a first permeated water pipe 22. A first concentrated water pipe 24 is connected to a first concentrated water outlet of the first reverse osmosis membrane treatment device 12. A second permeated water pipe 26 and a second concentrated water pipe 28 are connected, respectively, to a first permeated water outlet and a second concentrated water outlet of the second reverse osmosis membrane treatment device 14. To the first permeated water pipe 22, an oxidant adding pipe 30 may be connected as an oxidant adding unit for adding an oxidant.

A reverse osmosis membrane treatment method and operations of the reverse osmosis membrane treatment system 1 according to this embodiment will be described.

Treatment target water which is an object to be treated is stored in the treatment target water tank 10 as necessary by passing through the treatment target water pipe 18. The treatment target water is supplied to the first reverse osmosis membrane treatment device 12 through the treatment target water supply pipe 20 by the pump 16, and first reverse osmosis membrane treatment of treatment target water is performed in the first reverse osmosis membrane treatment device 12 (first reverse osmosis membrane treatment step). First permeated water obtained by the first reverse osmosis membrane treatment is supplied to the second reverse osmosis membrane treatment device 14 through the first permeated water pipe 22. In the first permeated water pipe 22, an oxidant as a modifier may be added to the first permeated water through the oxidant adding pipe 30 as necessary (oxidant adding step). After the oxidant is added as necessary, second reverse osmosis membrane treatment of first permeated water is performed in the second reverse osmosis membrane treatment device 14 (second reverse osmosis membrane treatment step). At least a part of the first permeated water obtained by the first reverse osmosis membrane treatment may be circulated to water supplied to the first reverse osmosis membrane treatment device 12, e.g. the treatment target water tank 10. First concentrated water obtained by the first reverse osmosis membrane treatment may be discharged through the first concentrated water pipe 24, or at least partially circulated to water supplied to the first reverse osmosis membrane treatment device 12, e.g. the treatment target water tank 10. Second permeated water obtained by the second reverse osmosis membrane treatment may be discharged through the second permeated water pipe 26, or at least partially circulated to water supplied to the first reverse osmosis membrane treatment device 12 at the preceding pass, e.g. the treatment target water tank 10, or at least partially circulated to water supplied to the second reverse osmosis membrane treatment device 14, e.g. the first permeated water pipe 22. The second concentrated water obtained by the second reverse osmosis membrane treatment may be discharged through the second concentrated water pipe 28, or at least partially circulated to water supplied to the first reverse osmosis membrane treatment device 12 at the preceding pass, e.g. the treatment target water tank 10, or at least partially circulated to water supplied to the second reverse osmosis membrane treatment device 14, e.g. the first permeated water pipe 22. A pump may be provided in the first permeated water pipe 22 to perform repressurization. The oxidant can be added in the first permeated water pipe 22, and may be added on the intake side or the discharge side of the pump provided in the first permeated water pipe 22. A pH adjuster may be added to the first permeated water in the first reverse osmosis membrane treatment device 12. A degassing membrane device 13 as a degassing unit may be provided between the first reverse osmosis membrane treatment device 12 and the second reverse osmosis membrane treatment device 14 to perform degassing treatment of the first permeated water. At least one of a free chlorine or total chlorine measuring unit, a pH measuring unit, an inorganic carbon concentration (IC) measuring unit and the like may be provided between the first reverse osmosis membrane treatment device 12 and the second reverse osmosis membrane treatment device 14, or in the second concentrated water pipe 28.

In the reverse osmosis membrane treatment system 1, at least one reverse osmosis membrane treatment device (third reverse osmosis membrane treatment device, fourth reverse osmosis membrane treatment device as necessary, and/or additional subsequent reverse osmosis membrane treatment device) may be further provided on the second permeated water side of the second reverse osmosis membrane treatment device 14 for the purpose of, for example, improving the water quality of permeated water. In this case, it is preferable that the permeation flux per 1 MPa of effective pressure in a reverse osmosis membrane used after the second reverse osmosis membrane treatment is lower than the permeation flux per 1 MPa of effective pressure in the first reverse osmosis membrane, and the permeation flux per 1 MPa of effective pressure in the reverse osmosis membrane used after the second reverse osmosis membrane treatment is 0.5 $m^3/m^2/d$ or less.

In the reverse osmosis membrane treatment method and treatment system according to this embodiment, treatment is performed with double or more pass of reverse osmosis membranes, the permeation flux per 1 MPa of effective pressure in the second reverse osmosis membrane is lower than the permeation flux per 1 MPa of effective pressure in the first reverse osmosis membrane, and the permeation flux per 1 MPa of effective pressure in the second reverse osmosis membrane is 0.5 $m^3/m^2/d$ or less. The present inventors closely examined a relationship between the rejection against a low-molecular-weight organic substance and the permeation flux per 1 MPa of effective pressure in the second reverse osmosis membrane, and resultantly found that there was a quadratic correlation. Here, since the permeation flux per 1 MPa of effective pressure (=0.5 $m^3/m^2/d$) formed a deflection point, a reverse osmosis membrane with a high rejection, i.e. "a reverse osmosis membrane having a permeation flux of 0.5 $m^3/m^2/d$ or less per 1 MPa of effective pressure", was used as a reverse osmosis membrane in the second pass. When additional reverse osmosis membrane treatment devices at third and subsequent pass are provided on the second permeated water side, it is preferable that the permeation flux per 1 MPa of effective pressure in each of reverse osmosis membranes used in the second and subsequent reverse osmosis membrane treatments is lower than the permeation flux per 1 MPa of effective pressure in the first reverse osmosis membrane, and the permeation flux per 1 MPa of effective pressure in each of the reverse osmosis membranes used in the second and subsequent reverse osmosis membrane treatments is 0.5 $m^3/m^2/d$ or less. Accordingly, a sufficient water quality improvement effect can be obtained in a reverse osmosis membrane treatment system and treatment method for performing treatment with double or more pass of reverse osmosis membranes. Preferably, the first reverse osmosis membrane is "a reverse osmosis membrane having permeation flux of more than 0.5 $m^3/m^2/d$ per 1 MPa of effective pressure", and the second reverse osmosis membrane or each of the reverse osmosis membranes used in the second and subsequent reverse osmosis membrane treatments is a reverse osmosis membrane with a high rejection, i.e. "a reverse osmosis membrane having a permeation flux of 0.5 $m^3/m^2/d$ or less per 1 MPa of effective pressure".

The permeation flux per 1 MPa of effective pressure in the second reverse osmosis membrane or each of the reverse osmosis membranes used in the second and subsequent reverse osmosis membrane treatments is 0.5 $m^3/m^2/d$ or less, preferably 0.4 $m^3/m^2/d$ or less. When the permeation flux per 1 MPa of effective pressure in the second reverse osmosis membrane or each of the reverse osmosis membranes used in the second and subsequent reverse osmosis membrane treatments is more than 0.5 $m^3/m^2/d$, the water quality of the resulting treated water is deteriorated.

While the permeation flux per 1 MPa of effective pressure in the second reverse osmosis membrane or each of the reverse osmosis membranes used in the second and subsequent reverse osmosis membrane treatments is not limited as long as it is lower than the permeation flux per 1 MPa of effective pressure in the first reverse osmosis membrane, the permeation flux per 1 MPa of effective pressure in the second reverse osmosis membrane or each of the reverse osmosis membranes used in the second and subsequent reverse osmosis membrane treatments is, for example, in a range of 10% to 60%, preferably in a range of 15% to 45% of the permeation flux per 1 MPa of effective pressure in the first reverse osmosis membrane. When the permeation flux per 1 MPa of effective pressure in the second reverse osmosis membrane or each of the reverse osmosis membranes used in the second and subsequent reverse osmosis membrane treatments is equal to or higher than the permeation flux per 1 MPa of effective pressure in the first reverse osmosis membrane, the water quality of the resulting treated water is deteriorated.

In the reverse osmosis membrane treatment method and treatment system according to this embodiment, the second reverse osmosis membrane, preferably each of the second and subsequent reverse osmosis membranes, is preferably a membrane modified with an oxidant as a modifier. When a membrane modified with an oxidant is used as a reverse osmosis membrane with a high rejection, water quality may further improved. For obtaining a membrane modified with an oxidant, a modifier may be brought into contact with the reverse osmosis membrane with the modifier added in water supplied to the reverse osmosis membrane, washing water or the like, or the reverse osmosis membrane may be immersed in water containing a modifier.

The oxidant is not particularly limited as long as it has an oxidative effect, and examples thereof include chlorine-based oxidants, bromine-based oxidants, stabilized hypochlorous acid compositions and stabilized hypobromous acid compositions.

Examples of the chlorine-based oxidant include chlorine gas, chlorine dioxide, hypochlorous acid or salts thereof, chlorous acid or salts thereof, chloric acid or salts thereof, perchloric acid or salts thereof, and chlorinated isocyanuric acid or salts thereof. Examples of the salt, among the above-described compounds, include alkali metal salts of hypochlorous acid such as sodium hypochlorite and potassium hypochlorite, alkali earth metal salts of hypochlorous acid such as calcium hypochlorite and barium hypochlorite, alkali metal salts of chlorous acid such as sodium chlorite and potassium chlorite, alkali earth metal salts of chlorous acid such as barium chlorite, metal salts of chlorous acid such as nickel chlorite, alkali metal salts of chloric acid such as ammonium chlorate, sodium chlorate and potassium chlorate, and alkali earth metal salts of chloric acid such as calcium chlorate and barium chlorate. These chlorine-based oxidants may be used singly, or used in combination of two or more thereof. Preferably, sodium hypochlorite is used as a chlorine-based oxidant from the viewpoint of handleability.

Examples of the bromine-based oxidant include bromine (liquid bromine), bromine chloride, bromic acid, bromates and hypobromous acid. The hypobromous acid may be produced by reacting a bromide such as sodium bromide with a chlorine-based oxidant such as hypochlorous acid.

The stabilized hypochlorous acid composition contains a chlorine-based oxidant and a sulfamic acid compound. The "stabilized hypochlorous acid composition containing a chlorine-based oxidant and a sulfamic acid compound" may be a stabilized hypochlorous acid composition containing a mixture of "a chlorine-based oxidant" and "a sulfamic acid compound", or a stabilized hypochlorous acid composition containing "a reaction product of a chlorine-based oxidant and a sulfamic acid compound".

The stabilized hypobromous acid composition contains a bromine-based oxidant and a sulfamic acid compound. The "stabilized hypobromous acid composition containing a bromine-based oxidant and a sulfamic acid compound" may be a stabilized hypobromous acid composition containing a mixture of "a bromine-based oxidant" and "a sulfamic acid compound", or a stabilized hypobromous acid composition containing "a reaction product of a bromine-based oxidant and a sulfamic acid compound".

The oxidant is preferably a stabilized hypochlorous acid composition or a stabilized hypobromous acid composition, more preferably a stabilized hypobromous acid composition, among the above-mentioned oxidants. A stabilized hypochlorous acid composition or a stabilized hypobromous acid composition exhibits a slime suppression effect and a modification effect equal to or greater than those of a chlorine-based oxidant such as hypochlorous acid, but has a low degradation effect on a reverse osmosis membrane compared to a chlorine-based oxidant, so that degradation of a membrane by repeating modification can be suppressed. Therefore, a stabilized hypochlorous acid composition or a stabilized hypobromous acid composition to be used in the reverse osmosis membrane treatment method and treatment system according to this embodiment is suitable as a modifier.

Thus, in the reverse osmosis membrane treatment method and treatment system according to this embodiment, the second reverse osmosis membrane, or each of the reverse osmosis membranes used in the second and subsequent reverse osmosis membrane treatments, is preferably a membrane modified with at least one of a stabilized hypobromous acid composition containing a bromine-based oxidant and a sulfamic acid compound and a stabilized hypochlorous acid composition containing a chlorine-based oxidant and a sulfamic acid compound.

When the "bromine-based oxidant" is bromine in the reverse osmosis membrane treatment method and treatment system according to this embodiment, the degradation effect on a reverse osmosis membrane may be very low because there exists no chlorine-based oxidant, and a slime suppression effect and a modification effect on the reverse osmosis membrane can be exhibited. When a chlorine-based oxidant is contained, production of chloric acid may be concerned.

In the reverse osmosis membrane treatment method and treatment system according to this embodiment, for example, a mixture of "a bromine-based oxidant" and "a sulfamic acid compound" or a mixture of "a chlorine-based oxidant" and "a sulfamic acid compound" is caused to exist as a modifier in water supplied to a reverse osmosis membrane, or the like. Accordingly, a stabilized hypobromous acid composition or a stabilized hypochlorous acid composition may be produced in treatment target water.

In the reverse osmosis membrane treatment method and treatment system according to this embodiment, for example, a stabilized hypobromous acid composition which is "a reaction product of a bromine-based oxidant and a sulfamic acid compound" or a stabilized hypochlorous acid composition which is "a reaction product of a chlorine-based oxidant and a sulfamic acid compound" is caused to exist as a modifier in water supplied to a reverse osmosis membrane, or the like.

Specifically, in the reverse osmosis membrane treatment method and treatment system according to this embodiment, for example, a mixture of "bromine", "bromine chloride", "hypobromous acid" or "a reaction product of sodium bromide and hypochlorous acid" and "a sulfamic acid compound" is caused to exist as a modifier in water supplied to a reverse osmosis membrane, or the like. Alternatively, a mixture of "hypochlorous acid" and "a sulfamic acid compound" may be caused to exist as a modifier in water supplied to a reverse osmosis membrane, or the like.

In the reverse osmosis membrane treatment method and treatment system according to this embodiment, for example, a stabilized hypobromous acid composition which is "a reaction product of bromine and a sulfamic acid compound", "a reaction product of bromine chloride and a sulfamic acid compound", "a reaction product of hypobromous acid and a sulfamic acid compound" or "a reaction product of a sulfamic acid compound and a reaction product of sodium bromide and hypochlorous acid" is caused to exist as a modifier in water supplied to a reverse osmosis membrane, or the like. Alternatively, a stabilized hypochlorous acid composition which is "a reaction product of hypochlorous acid and a sulfamic acid compound" may be caused to exist as a modifier in water supplied to a reverse osmosis membrane, or the like.

In the reverse osmosis membrane treatment method and treatment system according to this embodiment, the oxidant is brought into contact with the reverse osmosis membrane preferably in a pH range of 3 to 12, more preferably in a pH range of 4 to 9. When the oxidant is brought into contact with the reverse osmosis membrane at a pH of less than 3, the rejection may be reduced due to degradation of the reverse osmosis membrane in the case where the oxidant is in contact with the reverse osmosis membrane for a long period of time, and when the oxidant is brought into contact with the reverse osmosis membrane at a pH of more than 12, the modification effect may be insufficient. In particular, when the oxidant is brought into contact with the reverse osmosis membrane in a pH range of 4 to 9, the quality of permeated water from the reverse osmosis membrane can be sufficiently improved while degradation of the reverse osmosis membrane is suppressed. For bringing the modifier into contact with the reverse osmosis membrane in the above-described pH range, for example, the pH of water supplied to a reverse osmosis membrane, or the like, may be maintained within the above-described range, or the pH of the liquid in which the reverse osmosis membrane is immersed may be maintained within the above-described range.

In the reverse osmosis membrane treatment method and treatment system according to this embodiment, for example, "a bromine-based oxidant" or "a chlorine-based oxidant" and "a sulfamic acid compound" may be injected by a chemical injection pump or the like into water supplied to a reverse osmosis membrane, or the like, at the time of operating a reverse osmosis membrane device including a reverse osmosis membrane. The "bromine-based oxidant" or the "chlorine-based oxidant" and the "sulfamic acid compound" may be separately added in supplied water or the like, or may be added in water supplied to a reverse osmosis membrane, or the like, after being mixed together in the form of stock solutions. For example, a modifier may be brought into contact with a reverse osmosis membrane by immersing the reverse osmosis membrane in water containing "a bromine-based oxidant" or "a chlorine-based oxidant" and "a sulfamic acid compound" for a predetermined time.

For example, "a reaction product of a bromine-based oxidant and a sulfamic acid compound" or "a reaction product of a chlorine-based oxidant and a sulfamic acid compound" may be injected by a chemical injection pump or the like into water supplied to a reverse osmosis membrane, or the like. For example, a modifier may be brought into contact with a reverse osmosis membrane by immersing the reverse osmosis membrane in water containing "a reaction product of a bromine-based oxidant and a sulfamic acid compound" or "a reaction product of a sulfamic acid compound and a reaction product of a bromine compound and a chlorine-based oxidant" for a predetermined time.

For modification by an oxidant, an oxidant may be continuously or intermittently added in water supplied to a reverse osmosis membrane, washing water or the like at the time of operating a reverse osmosis membrane device including a reverse osmosis membrane, or when the rejection of the reverse osmosis membrane is reduced, an oxidant may be continuously or intermittently added in water supplied to a reverse osmosis membrane, washing water or the like, or the reverse osmosis membrane may be immersed in water containing an oxidant.

The oxidant may be brought into contact with the reverse osmosis membrane under a normal pressure condition, under a pressurized condition or under a decompressed condition, but it is preferable to bring the oxidant into contact with the reverse osmosis membrane under a pressurized condition because modification can be performed without stopping the reverse osmosis membrane device, modification of the reverse osmosis membrane can be reliably performed, or the like. Preferably, the oxidant may be brought into contact with the reverse osmosis membrane under a pressurized condition of, for example, 0.1 MPa to 8.0 MPa.

The oxidant may be brought into contact with the reverse osmosis membrane under a temperature condition of, for example, 5° C. to 35° C.

In the reverse osmosis membrane treatment method and treatment system according to this embodiment, the ratio of the equivalent of "a sulfamic acid compound" to the equivalent of "a bromine-based oxidant" or "a chlorine-based oxidant" is preferably 1 or more, more preferably 1 or more and 2 or less. When the ratio of the equivalent of "a sulfamic acid compound" to the equivalent of "a bromine-based oxidant" or "a chlorine-based oxidant" is less than 1, the reverse osmosis membrane may be degraded, and when the ratio is more than 2, the production cost may increase.

The total concentration of chlorine brought into contact with the reverse osmosis membrane is preferably 0.01 to 100 mg/L in terms of effective chlorine concentration. When the total concentration of the chlorine is less than 0.01 mg/L, it may be impossible to obtain a sufficient modification effect, and when the total concentration of the chlorine is more than 100 mg/L, degradation of the reverse osmosis membrane, or corrosion of a pipe or the like may occur.

A preparation of "bromine and a sulfamic acid compound (a mixture of bromine and a sulfamic acid compound)" or "a reaction product of bromine and a sulfamic acid compound" in which bromine is used is more preferable as a modifier because the amount of by-produced bromic acid may be smaller and the reverse osmosis membrane may be less degraded compared to a preparation of "hypochlorous acid, a bromine compound and sulfamic acid", a preparation of "bromine chloride and sulfamic acid", and the like.

That is, in the reverse osmosis membrane treatment method and treatment system according to this embodiment, it is preferable that bromine and a sulfamic acid compound are caused to exist (a mixture of bromine and a sulfamic acid compound is caused to exist) in water supplied to a reverse osmosis membrane, or the like. It is preferable that a reaction product of bromine and a sulfamic acid compound is caused to exist in water supplied to a reverse osmosis membrane, or the like.

Examples of the bromine compound include sodium bromide, potassium bromide, lithium bromide, ammonium bromide and hydrobromic acid. Among them, sodium bromide is preferable from the viewpoint of production cost and the like.

The sulfamic acid compound is a compound represented by the following general formula (1).

$$R_2NSO_3H \quad (1)$$

(wherein each R independently represents a hydrogen atom or an alkyl group having 1 to 8 carbon atoms).

Examples of the sulfamic acid compound include sulfamic acid in which both of two R groups is a hydrogen atom (amide sulfuric acid); sulfamic acid compounds in which one of two R groups is a hydrogen atom and the other R group is an alkyl group having 1 to 8 carbon atoms, such as N-methylsulfamic acid, N-ethylsulfamic acid, N-propylsulfamic acid, N-isopropylsulfamic acid and N-butylsulfamic acid; sulfamic acid compounds in which both of two R groups is an alkyl group having 1 to 8 carbon atoms, such as N,N-dimethylsulfamic acid, N,N-diethylsulfamic acid, N,N-dipropylsulfamic acid, N,N-dibutylsulfamic acid, N-methyl-N-ethylsulfamic acid and N-methyl-N-propylsulfamic acid; sulfamic acid compounds in which one of two R groups is a hydrogen atom and the other R group is an aryl group having 6 to 10 carbon atoms, such as N-phenylsulfamic acid; and salts thereof. Examples of the sulfamic acid salt include alkali metal salts such as sodium salts and potassium salts, alkali earth metal salts such as calcium salts, strontium salts and barium salts, other metal salts such as manganese salts, copper salts, zinc salts, iron salts, cobalt salts and nickel salts, and ammonium salts and guanidine salts. The sulfamic acid compounds and salts thereof may be used singly, or used in combination of two or more thereof. Preferably, sulfamic acid (amide sulfuric acid) is used as a sulfamic acid compound from the viewpoint of an environmental load and the like.

In the reverse osmosis membrane treatment method and treatment system according to this embodiment, further an alkali may be caused to exist when at least one of a stabilized hypobromous acid composition and a stabilized hypochlorous acid composition is caused to exist as a modifier in water supplied to a reverse osmosis membrane, or the like. Examples of the alkali include alkali hydroxides such as sodium hydroxide and potassium hydroxide. Sodium hydroxide and potassium hydroxide may be used in combination from the viewpoint of production stability at a low temperature, and the like. The alkali may be used in the form of an aqueous solution rather than a solid.

The reverse osmosis membrane treatment method and treatment system according to this embodiment can be suitably applied to a cellulose acetate membrane or a polyamide-based polymer membrane which is currently mainstream. A polyamide-based polymer membrane has relatively low resistance to an oxidant, so that when free chlorine or the like is continuously brought into contact with the polyamide-based polymer membrane, membrane performance is noticeably deteriorated. However, in the reverse osmosis membrane treatment method and treatment system according to this embodiment, even a polyamide-based polymer membrane may hardly undergo such noticeable deterioration of membrane performance.

Each of reverse osmosis membranes used in the second and subsequent reverse osmosis membrane treatments has a lower permeation flux per 1 MPa of effective pressure compared to a reverse osmosis membrane used in the first reverse osmosis membrane treatment, but has dramatically improved blocking performance. "A reverse osmosis membrane having a permeation flux of 0.5 m³/m²/d or less per 1 MPa of effective pressure" is used in each of the second and subsequent reverse osmosis membrane treatments, a reverse osmosis membrane having a lower permeation flux per 1 MPa of effective pressure compared to each of the reverse osmosis membranes used in the second reverse osmosis membrane treatments is used in the first reverse osmosis membrane treatment, and in the first reverse osmosis membrane treatment, it is preferable to use "a reverse osmosis membrane having a permeation flux of more than 0.5 m³/m²/d per 1 MPa of effective pressure". The quality of treated water in a second-pass reverse osmosis membrane device in which "a reverse osmosis membrane having a permeation flux of 0.5 m³/m²/d or less per 1 MPa of effective pressure" is used in second-pass reverse osmosis membrane treatment may be considerably higher than the quality of treated water in a conventional double-pass reverse osmosis membrane system using "a reverse osmosis membrane having a permeation flux of more than 0.5 m$^3$/m$^2$/d per 1 MPa of effective pressure".

The permeation flux is obtained by dividing an amount of permeated water by a membrane area. The "effective pressure" is an effective pressure acting on a membrane, which is obtained by subtracting an osmotic pressure difference and a secondary-side pressure from an average operating pressure as specified in "Membrane Terminology" in JIS K3802: 2015. The average operating pressure is an average of a pressure of water supplied to a membrane on the primary side of the membrane (operation pressure) and a pressure of concentrated water (concentrated water outlet pressure), and is given by the following equation.

average operating pressure=(operation pressure+concentrated water outlet pressure)/2

The permeation flux per 1 MPa of effective pressure can be calculated from data described in a brochure from a membrane manufacturer, e.g. an amount of permeated water, a membrane area, a recovery ratio in evaluation, a NaCl concentration and the like. When several membranes having the same permeation flux are loaded in one or more pressure vessels, the permeation flux of each of the loaded membranes can be calculated from data such as an average operating pressure/secondary-side pressure in the pressure vessel, water quality of raw water, an amount of permeated water and the number of membranes.

Examples of the membrane which can be used as a reverse osmosis membrane for the second reverse osmosis membrane treatment or each of the second and subsequent reverse osmosis membrane treatments and which has a permeation flux of 0.5 m$^3$/m$^2$/d per 1 MPa of effective pressure include SWC Series (Hydranautics®), TM800 Series (Toray Industries, Inc.), SW30 Series (DOW®) and HR-RO Series (Kurita Water Industries Ltd.). Specific examples thereof include SWC5MAX (permeation flux per 1 MPa of effective pressure: 0.32 m$^3$/m$^2$/d) (Hydranautics®), SWC6MAX (permeation flux per 1 MPa of effective pressure: 0.43 m$^3$/m$^2$/d) (Hydranautics®), SW30ULE (permeation flux per 1 MPa of effective pressure: 0.39 m$^3$/m$^2$/d) (DOW®), SW30HRLE (permeation flux per 1 MPa of effective pressure: 0.25 m$^3$/m$^2$/d) (DOWR), TM820V (permeation flux per 1 MPa of effective pressure: 0.32 m$^3$/m$^2$/d) (Toray Industries, Inc.), TM820K (permeation flux per 1 MPa of effective pressure: 0.20 m$^3$/m$^2$/d) (Toray Industries, Inc.) and HR-RO (permeation flux per 1 MPa of effective pressure: 0.36 m$^3$/m$^2$/d) (Kurita Water Industries Ltd.).

Examples of the membrane which has a higher permeation flux per 1 MPa of effective pressure compared to the reverse osmosis membrane for the second reverse osmosis membrane treatment or each of the second and subsequent reverse osmosis membrane treatments, and which can be used as a first reverse osmosis membrane, include ES20-D8 (permeation flux per 1 MPa of effective pressure: 1.14 m$^3$/m$^2$/d) (Nitto Denko Corporation), LFC3-LD (permeation flux per 1 MPa of effective pressure: 0.79 m$^3$/m$^2$/d) (Hydranautics®), BW30XFR (permeation flux per 1 MPa of effective pressure: 0.84 m$^3$/m$^2$/d) (DOW®) and TML20-D (permeation flux per 1 MPa of effective pressure: 0.78 m$^3$/m$^2$/d) (Toray Industries, Inc.).

The membrane shape of the reverse osmosis membrane is not particularly limited, examples thereof include a tubular type, a flat sheet membrane type, a spiral wound type and a hollow fiber type, and the spiral wound type may be any of a 4-inch element type, an 8-inch element type, a 16-inch element type and the like.

The first reverse osmosis membrane treatment device 12, the second reverse osmosis membrane treatment device 14, and reverse osmosis membrane treatment devices subsequent to the second reverse osmosis membrane treatment device may each include several modules. That is, supply water may be supplied to each of several modules of each reverse osmosis membrane device, or concentrated water in a module may be used as supply water for a next module (Christmas tree system).

A dispersant may be used in combination with an antimicrobial agent for preventing scaling in the case where scale is generated when the pH of treatment target water is 7 or more in the reverse osmosis membrane device. Examples of the dispersant include polyacrylic acid, polymaleic acid and phosphonic acid. The amount of the dispersant added to treatment target water is in a range of, for example, 0.1 to 1,000 mg/L in terms of a concentration in RO concentrated water.

To prevent scaling without using a dispersant, for example, operation conditions of the reverse osmosis membrane device, such as a recovery ratio, are adjusted so that the concentration of silica in RO concentrated water is equal to or less than the solubility of silica, and the Langelier saturation index as an index of calcium scale is 0 or less.

Examples of the application of the reverse osmosis membrane device include primary pure water systems in production of ultrapure water, and recovery of waste water. With respect to these applications, the reverse osmosis membrane device can be suitably used for treatment of treatment target water containing at least one of boron and a low-molecular-weight organic substance having a molecular weight of 200 or less, which are difficult to remove with a conventional double-pass reverse osmosis membrane device using "a reverse osmosis membrane having a permeation flux of more than 0.5 m$^3$/m$^2$/d per 1 MPa of effective pressure". Examples of the low-molecular-weight organic substance having a molecular weight of 200 or less include alcohol compounds such as methanol, ethanol and isopropyl alcohol (IPA), amine compounds such as monoethanolamine and urea, and tetraalkylammonium salts such as tetramethylammonium hydroxide.

<Water Treatment System>

Figure 2:
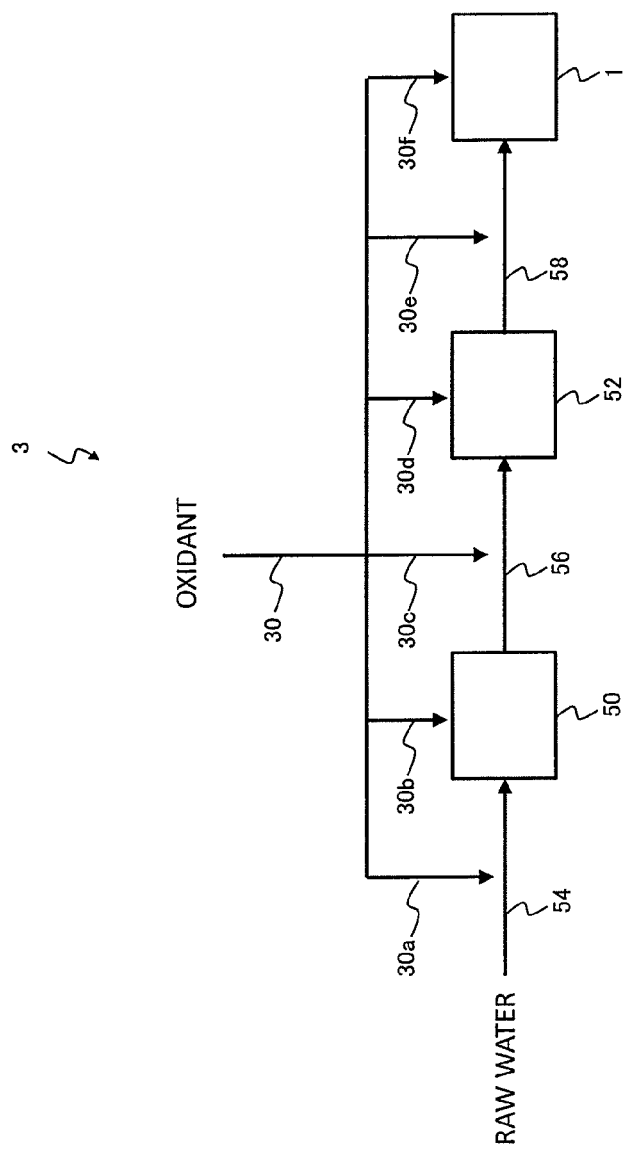
FIG. 2 is a schematic block diagram showing one example of a water treatment system including the reverse osmosis membrane treatment system according to the embodiment of the present invention.

In the reverse osmosis membrane treatment method and treatment system according to this embodiment, treatment target water is preferably pretreated water treated in pretreatment in advance as shown in FIG. 2.

For example, as shown in FIG. 2, a water treatment system 3 includes the reverse osmosis membrane treatment system 1, and includes a pretreatment system 50 before the reverse osmosis membrane treatment system 1. The water treatment system 3 may include a pretreated water tank 52 as necessary.

In the water treatment system 3, a raw water supply pipe 54 is connected to an inlet of the pretreatment system 50, and an outlet of the pretreatment system 50 is connected to an inlet of the pretreated water tank 52 by a pretreated water pipe 56. An outlet of the pretreated water tank 52 is connected to an inlet of the reverse osmosis membrane treatment system 1 by a pretreated water supply pipe 58. For example, the pretreated water supply pipe 58 is connected to the treatment target water pipe 18 of the reverse osmosis membrane treatment system 1.

The oxidant adding pipe 30 for adding an oxidant as a modifier may be connected to at least one of the raw water supply pipe 54 as an oxidant adding pipe 30a, the pretreatment system 50 as an oxidant adding pipe 30b, the pretreated water pipe 56 as an oxidant adding pipe 30c, the pretreated water tank 52 as an oxidant adding pipe 30d, the pretreated water supply pipe 58 as an oxidant adding pipe 30e, and the reverse osmosis membrane treatment system 1 as an oxidant adding pipe 30f.

In the water treatment system 3, raw water is supplied to the pretreatment system 50 through the raw water supply pipe 54, and subjected to pretreatment as described later (pretreatment step) in the pretreatment system 50. The pretreated water subjected to pretreatment is stored in the pretreated water tank 52 as necessary by passing through the pretreated water pipe 56, and then supplied to the reverse osmosis membrane treatment system 1 through the pretreated water supply pipe 58. In the reverse osmosis membrane treatment system 1, double or more of reverse osmosis membrane treatments are performed (reverse osmosis membrane treatment step) as described above.

An oxidant as a modifier may be added to at least one of raw water, pretreated water, and treatment target water in the raw water supply pipe 54 through the oxidant adding pipe 30a, and/or in the pretreatment system 50 through the oxidant adding pipe 30b, and/or in the pretreated water pipe 56 through the oxidant adding pipe 30c, and/or in the pretreated water tank 52 through the oxidant adding pipe 30d, and/or in the pretreated water supply pipe 58 through the oxidant adding pipe 30e, and/or in the reverse osmosis membrane treatment system 1 through the oxidizing adding pipe 26f.

In the pretreatment step, biological, physical or chemical pretreatment such as biological treatment, flocculation treatment, flocculation and precipitation treatment, dissolved air floatation treatment, filtration treatment, membrane separation treatment, activated carbon treatment, ozone treatment, ultraviolet ray irradiation treatment, softening treatment or decarbonation treatment, or a combination of the pretreatments, is performed as necessary.

In the reverse osmosis membrane treatment system 1, a total chlorine concentration measuring device, a pump, a safety filter, a flow mater, a pressure gauge, a temperature mater, an oxidation-reduction potential (ORP) mater, a residual chlorine mater, an electric conductivity mater, a pH mater, an energy recovery device and the like may be provided as necessary in addition to reverse osmosis membranes in the system.

For posttreatment (posttreatment step) in the reverse osmosis membrane treatment system 1, a regenerative ion-exchange resin device, an electric deionization treatment device (EDI), a non-regenerative ion-exchange resin device, a degassing membrane treatment device, an ultraviolet ray sterilizing device, an ultraviolet ray oxidizing device, a heating device, an ultrafiltration device and the like may be provided.

In the water treatment system 3, a dispersant and an antimicrobial agent other than an oxidant, a pH adjuster and the like may be added to at least one of raw water, pretreated water and treatment target water in at least one of raw water supply pipe 54, the pretreatment system 50, the pretreated water pipe 56, the pretreated water tank 52, the pretreated water supply pipe 58 and the reverse osmosis membrane treatment system 1.

<Reverse Osmosis Membrane Modifier>

The reverse osmosis membrane modifier according to this embodiment contains a stabilized hypobromous acid composition or a stabilized hypochlorous acid composition containing a mixture of "a bromine-based oxidant or a chlorine-based oxidant" and "a sulfamic acid compound", and may further contain an alkali.

The modifier according to this embodiment contains a stabilized hypobromous acid composition containing "a reaction product of a bromine-based oxidant and a sulfamic acid compound" or a stabilized hypochlorous acid composition containing "a reaction product of a chlorine-based oxidant and a sulfamic acid compound", and may further contain an alkali.

The bromine-based oxidant, the bromine compound, the chlorine-based oxidant and the sulfamic acid compound are as described above.

Examples of the commercially available stabilized hypochlorous acid composition containing a chlorine-based oxidant and a sulfamic acid compound include "Kuriverter IK-110" manufactured by Kurita Water Industries Ltd.

The modifier according to this embodiment is preferably one containing bromine and a sulfamic acid compound (one containing a mixture of bromine and a sulfamic acid compound), e.g. a mixture of bromine, a sulfamic acid compound, an alkali and water, or one containing a reaction product of bromine and a sulfamic acid compound, e.g. a mixture of a reaction product of bromine and a sulfamic acid compound, an alkali and water.

Among the modifiers according to this embodiment, slime suppressing agents containing a stabilized hypobromous acid composition containing a bromine-based oxidant and a sulfamic acid compound, particularly slime suppressing agents containing stabilized hypobromous acid composition containing bromine and a sulfamic acid compound have a higher oxidizing ability, and a much higher modification effect, slime suppressing ability, and slime separating ability compared to modifiers containing a chlorine-based oxidant and a sulfamic acid compound (chlorosulfamic acid etc.), but hardly cause noticeable membrane degradation as is caused by hypochlorous acid having a comparatively high oxidizing ability. At a normal service concentration, a membrane degradation effect can be substantially ignored. Therefore, the above-mentioned slime suppressing agents are most suitable as a modifier.

Unlike hypochlorous acid, the modifier according to this embodiment hardly permeates a reverse osmosis membrane, and therefore hardly affects the water quality of treated water. In addition, a concentration can be measured at a field site as with hypochlorous acid or the like, so that it is possible to more accurately control the concentration.

The pH of the modifier is, for example, more than 13.0, more preferably more than 13.2. When the pH of the modifier is 13.0 or less, an effective halogen in the modifier may be destabilized.

The concentration of bromic acid in the modifier is preferably less than 5 mg/kg. When the concentration of bromic acid in the modifier is 5 mg/kg or more, the concentration of bromate ions in RO permeated water may increase.

<Method for Producing Modifier>

The modifier according to this embodiment is obtained by mixing a bromine-based oxidant or a chlorine-based oxidant with a sulfamic acid compound, and further an alkali may be mixed.

Preferably, a method for producing a modifier containing a stabilized hypobromous acid composition containing bromine and a sulfamic acid compound includes the step of adding bromine to a mixed liquid containing water, an alkali and a sulfamic acid compound in an inert gas atmosphere to carry out a reaction, or the step of adding bromine to a mixed liquid containing water, an alkali and a sulfamic acid compound in an inert gas atmosphere. By adding bromine in an inert gas atmosphere to carry out a reaction, or adding bromine in an inert gas atmosphere, the concentration of bromate ions in the modifier decreases, so that the concentration of bromate ions in RO permeated water may decrease.

The inert gas to be used is not limited, but at least one of nitrogen and argon is preferable from the viewpoint of production and the like, and in particular, from the viewpoint of production cost and the like, nitrogen is preferable.

The concentration of oxygen in a reaction vessel at the time of adding bromine is preferably 6% or less, more preferably 4% or less, still more preferably 2% or less, especially preferably 1% or less. When the concentration of oxygen in the reaction vessel at the time of reacting bromine is more than 6%, the amount of bromic acid produced in the reaction system may increase.

The addition ratio of bromine is preferably 25% by weight or less, more preferably 1% by weight or more and 20% by weight or less based on the total amount of the modifier. When the addition ratio of bromine is more than 25% by weight based on the total amount of the modifier, the amount of bromic acid produced in the reaction system may increase. When the addition ratio is less than 1% by weight, the sterilizing ability may be deteriorated.

It is preferable to perform control so that the reaction temperature at the time of adding bromine is 0° C. or higher and 25° C. or lower, and it is more preferable to perform control so that the reaction temperature at the time of adding bromine is 0° C. or higher and 15° C. or lower from the viewpoint of production cost and the like. When the reaction temperature at the time of adding bromine is higher than 25° C., the amount of bromic acid produced in the reaction system may increase, and when the reaction temperature at the time of adding bromine is lower than 0° C., freezing may occur.

EXAMPLES

Hereinafter, the present invention will be described in more detail by way of Examples and Comparative Examples, but the present invention is not limited to the Examples below.

[Preparation of Stabilized Hypobromous Acid Composition]

16.9% by weight (wt %) of liquid bromine, 10.7% by weight of sulfamic acid, 12.9% by weight of sodium hydroxide, 3.94% by weight of potassium hydroxide, and water as a balance, were mixed in a nitrogen atmosphere to prepare a stabilized hypobromous acid composition. The stabilized hypobromous acid composition had a pH of 14 and a total chlorine concentration of 7.5% by weight. The total chlorine concentration is a value (mg/L as $Cl_2$) measured by a total chlorine measurement method (DPD (diethyl-p-phenylenediamine) method) using Multi-Item Water Quality Analyzer DR/4000 manufactured by HACH Company. Details of a method for preparing a stabilized hypobromous acid composition are as described below.

In a 2 L four-neck flask filled with a nitrogen gas by continuously injecting the nitrogen gas while controlling the flow rate of the nitrogen gas by a mass flow controller in such a manner that an oxygen concentration of 1% was maintained in a reaction vessel, 1436 g of water and 361 g of sodium hydroxide were added, and mixed, 300 g of sulfamic acid was then added, the resulting mixture was mixed, 473 g of liquid bromine was then added while maintaining cooling in such a manner that the temperature of the reaction liquid became 0 to 15° C., and 230 g of a 48% potassium hydroxide solution was further added to obtain a desired stabilized hypobromous acid composition (composition 1) in which the contents of sulfamic acid and bromine were 10.7% and 16.9%, respectively, in terms of a weight ratio to the total amount of the composition, and the ratio of the equivalent of sulfamic acid to the equivalent of bromine was 1.04. The resulting solution had a pH of 14 as measured by a glass electrode method. The resulting solution had a bromine content of 16.9% as measured by a method in which bromine was converted into iodine with potassium iodide, and oxidation-reduction titration was then performed using sodium thiosulfate, and the bromine content was 100.0% of a theoretical content (16.9%). In addition, the concentration of oxygen in the reaction vessel at the time of reacting bromine was measured using "Oxygen Monitor JKO-02 LJD11" manufactured by JICKO Ltd. The concentration of bromic acid was less than 5 mg/kg.

The pH was measured under the following conditions.

Electrode type: glass electrode type pH Meter: Model IOL-30 manufactured by DKK-TOA Corporation Calibration of electrode: two-point calibration was performed with a neutral phosphate pH (6.86) standard solution (type 2) and a borate pH (9.18) standard solution (type 2), each manufactured by Kanto Chemical Co., Inc.

Measurement temperature: 25° C.

Measured value: an electrode was immersed in a measurement liquid, a stabilized value was defined as a measured value, and an average of three measurements was adopted.

Example 1

Raw water (20 m$^3$/h) containing 3 ppm of isopropyl alcohol (IPA) was treated by a reverse osmosis membrane treatment system shown in FIG. 1. The recovery ratio in first-pass reverse osmosis membrane treatment was set to 75%, and the recovery ratio in second-pass reverse osmosis membrane treatment was set to 90%. A spiral wound membrane of 8 inches was used as a reverse osmosis membrane, and the number of membranes in each of the first pass and the second pass was 10. For the first-pass reverse osmosis membrane treatment, "ES20-D8" (manufactured by Nitto Denko Corporation; permeation flux per 1 MPa of effective pressure: 1.14 m$^3$/m$^2$/d) was used as a reverse osmosis membrane, and for the second reverse osmosis membrane treatment, "SWC5MAX" (manufactured by Hydranautics Company; permeation flux per 1 MPa of effective pressure: 0.32 m$^3$/m$^2$/d) was used as a reverse osmosis membrane. The result is shown in Table 1.

The permeation flux per 1 MPa of effective pressure was calculated on the basis of values in a specification sheet from each membrane manufacturer. For a reverse osmosis membrane with no specification sheet, the permeation flux was calculated on the basis of an average operating pressure, an amount of permeated water, and water quality of raw water, which were obtained by measuring indicated values on gauges attached to a second reverse osmosis membrane device.

Example 2

For first-pass reverse osmosis membrane treatment, "ES20-D8" was used as a reverse osmosis membrane, and for second-pass reverse osmosis membrane treatment, "SWC5MAX" was used as a reverse osmosis membrane.

The second-pass reverse osmosis membrane was subjected to rejection improvement treatment (modification treatment) by the following method. Except for the above, the same procedure as in Example 1 was carried out to perform reverse osmosis membrane treatment. The result is shown in Table 1.

[Rejection Improvement Treatment]

Water containing 10 ppm of the stabilized hypobromous acid composition as a rejection improver (modifier) was passed at an operating pressure of 2.0 MPa, a pH of 4 and a water temperature of 25±1° C. The treatment was ended at the time when the permeation flux per 1 MPa of effective pressure in the membrane after treatment reached 0.2 $m^3/m^2/d$.

Comparative Example 1

For both first-pass reverse osmosis membrane treatment and second-pass reverse osmosis membrane treatment, "ES20-D8" was used. The second-pass reverse osmosis membrane was subjected to rejection improvement treatment (modification treatment) by the following method. Except for the above, the same procedure as in Example 1 was carried out to perform reverse osmosis membrane treatment. The result is shown in Table 1.

[Rejection Improvement Treatment]

Water containing 1 ppm of polyethylene glycol (weight average molecular weight MW=5000) as a rejection improver (modifier) was used, and a total circulation operation of returning the total amount of concentrated water and permeated water to supply water was performed at an operating pressure of 1 MPa, a pH of 7 and a water temperature of 25° C. for 12 hours. The permeation flux per 1 MPa of effective pressure in the membrane after treatment was 1.0 $m^3/m^2/d$.

Comparative Example 2

Except that "ES20" (manufactured by Nitto Denko Corporation; permeation flux per 1 MPa of effective pressure: 1.14 $m^3/m^2/d$) was used as a second-pass reverse osmosis membrane, the same procedure as in Example 1 was carried out to perform reverse osmosis membrane treatment. The result is shown in Table 1.

Comparative Example 3

Except that "LFC3-LD" (manufactured by Hydranautics®; permeation flux per 1 MPa of effective pressure: 0.79 $m^3/m^2/d$) was used as a second-pass reverse osmosis membrane, the same procedure as in Example 1 was carried out to perform reverse osmosis membrane treatment. The result is shown in Table 1.

TABLE 1

| | Permeation flux per 1 MPa of effective pressure in second-pass reverse osmosis membrane [$m^3/m^2/d$] | IPA concentration of permeated water in first pass [ppm] | IPA concentration of permeated water in second pass [ppm] |
| --- | --- | --- | --- |
| Example 1 | 0.32 | 0.3 | 0.025 |
| Example 2 | 0.2 | 0.3 | 0.021 |
| Comparative Example 1 | 1.0 | 0.3 | 0.082 |
| Comparative Example 2 | 1.14 | 0.3 | 0.118 |
| Comparative Example 3 | 0.79 | 0.3 | 0.057 |

In the treatment methods in the Examples, permeated water had a lower IPA concentration and higher water quality compared to the treatment methods in Comparative Examples. In addition, water quality was further improved by using a stabilized hypobromous acid composition as a modifier.

Example 3

A reverse osmosis membrane modified by the method in Example 2 was used for second reverse osmosis membrane treatment, and water was passed for 1000 hours while the stabilized hypobromous acid composition was added at an inlet in the second-pass reverse osmosis membrane treatment. The stabilized hypobromous acid composition was added in such a manner that concentrated water in the second-pass reverse osmosis membrane treatment had a total chlorine concentration of 1.0 (mg/L as $Cl_2$). Other water passage conditions were the same as in Example 2. The result is shown in Table 2.

Example 4

A reverse osmosis membrane modified using hypochlorous acid as a modifier was used, and water was passed in the same manner as in Example 3. Modification conditions were the same as in Example 2, except that the modifier was changed to hypochlorous acid. The permeation flux per 1 MPa of effective pressure in the membrane after treatment was 0.2 $m^3/m^2/d$. The reverse osmosis membrane modified with hypochlorous acid was used for second-pass reverse osmosis membrane treatment, and water was passed for 1000 hours while hypochlorous acid was added at an inlet in the second-pass reverse osmosis membrane treatment. The hypochlorous acid was added in such a manner that concentrated water in the second-pass reverse osmosis membrane treatment had a total chlorine concentration of 1.0 (mg/L as $Cl_2$). Other water passage conditions were the same as in Example 2. The result is shown in Table 2.

TABLE 2

| | IPA concentration of permeated water in second pass just after modification | IPA concentration of permeated water in second pass after elapse of operation time of 1000 h |
| --- | --- | --- |
| Example 3 | 0.021 ppm | 0.024 ppm |
| Example 4 | 0.021 ppm | 0.042 ppm |

Comparison of IPA concentration of permeated water in second-pass reverse osmosis membrane treatment after an operation time of 1000 hours shows that in Example 3, there was little change, whereas in Example 4, the IPA concentration increased. It is considered that since a stabilized hypobromous acid composition has a lower degradation effect on a reverse osmosis membrane compared to hypochlorous acid, it was possible to suppress membrane degradation even when modification was performed for a long time.

Thus, according to the methods in the Examples, a sufficient water quality improvement effect was obtained in the reverse osmosis membrane treatment system and treatment method in which treatment is performed with double or more pass of reverse osmosis membranes.

REFERENCE SIGNS LIST

1 Reverse osmosis membrane treatment system
3 Water treatment system
10 Treatment target water tank
12 First reverse osmosis membrane treatment device
13 Degassing membrane device
14 Second reverse osmosis membrane treatment device
16 Pump
18 Treatment target water pipe
20 Treatment target water supply pipe
22 First permeated water pipe
24 First concentrated water pipe
26 Second permeated water pipe
28 Second concentrated water pipe
30, 30a, 30b, 30c, 30d, 30e, 30f Oxidant adding pipe
50 Pretreatment system
52 Pretreated water tank
54 Raw water supply pipe
56 Pretreated water pipe
58 Pretreated water supply pipe

The invention claimed is:

1. A reverse osmosis membrane treatment system comprising:
a first reverse osmosis membrane treatment unit for passing treatment target water through a first reverse osmosis membrane to obtain first permeated water and first concentrated water;
at least a second reverse osmosis membrane treatment unit for passing the first permeated water through a second reverse osmosis membrane to obtain second permeated water and second concentrated water; and
a pretreatment system configured to pretreat a raw water, the pretreatment system being provided upstream of the first reverse osmosis membrane treatment unit; wherein
a permeation flux per 1 MPa of effective pressure in the second reverse osmosis membrane is in a range of from 15% to 45% of a permeation flux per 1 MPa of effective pressure in the first reverse osmosis membrane, and a permeation flux per 1 MPa of effective pressure in the second reverse osmosis membrane is 0.5 m$^3$/m$^2$/d or less,
the effective pressure is determined in accordance with JIS K3802: 2015 and the permeation flux is obtained by dividing an amount of permeated water by a membrane area,
the treatment target water contains a substance to be removed selected from at least one of boron, urea, and tetraalkylammonium salts,
the substance to be removed is removed by the second reverse osmosis membrane,
the second reverse osmosis membrane is a membrane modified with an oxidant, and
an oxidant adding pipe is further provided to the pretreatment system and is configured to add the oxidant to at least the pretreatment system and a raw water supply pipe, through which the raw water is supplied to the pretreatment system.

2. The reverse osmosis membrane treatment system according to claim 1, wherein the second reverse osmosis membrane is a membrane modified with at least one of a stabilized hypobromous acid composition containing a bromine-based oxidant and a sulfamic acid compound and a stabilized hypochlorous acid composition containing a chlorine-based oxidant and a sulfamic acid compound.

3. The reverse osmosis membrane treatment method according to claim 1, wherein the treatment target water contains a substance to be removed selected from at least one of boron and urea.

4. The reverse osmosis membrane treatment system according to claim 1, wherein a pH adjuster is added to adjust the pH of the first permeated water in the first reverse osmosis membrane treatment device, and
a degassing membrane device is configured to perform a degassing treatment to the first permeated water, and
the degassing membrane device is positioned between the first reverse osmosis membrane and the second reverse osmosis membrane.

5. A reverse osmosis membrane treatment method comprising:
a first reverse osmosis membrane treatment of passing treatment target water through a first reverse osmosis membrane to obtain first permeated water and first concentrated water;
at least a second reverse osmosis membrane treatment of passing the first permeated water through a second reverse osmosis membrane to obtain second permeated water and second concentrated water; and
a pretreatment system for pretreating a raw water, the pretreatment system being provided upstream of the first reverse osmosis membrane treatment unit; wherein
a permeation flux per 1 MPa of effective pressure in the second reverse osmosis membrane is in a range of from 15% to 45% of a permeation flux per 1 MPa of effective pressure in the first reverse osmosis membrane, and a permeation flux per 1 MPa of effective pressure in the second reverse osmosis membrane is 0.5 m$^3$/m$^2$/d or less, the effective pressure is determined in accordance with JIS K3802: 2015 and the permeation flux is obtained by dividing an amount of permeated water by a membrane area,
the treatment target water contains a substance to be removed selected from at least one of boron, urea, and tetraalkylammonium salts,
the substance to be removed is removed by the second reverse osmosis membrane,
the second reverse osmosis membrane is a membrane modified with an oxidant, and
an oxidant adding pipe is further provided to the pretreatment system for adding the oxidant to at least the pretreatment system and a raw water supply pipe, through which the raw water is supplied to the pretreatment system.

6. The reverse osmosis membrane treatment method according to claim 5, wherein the second reverse osmosis membrane is a membrane modified with at least one of a stabilized hypobromous acid composition containing a bromine-based oxidant and a sulfamic acid compound and a stabilized hypochlorous acid composition containing a chlorine-based oxidant and a sulfamic acid compound.

7. The reverse osmosis membrane treatment method according to claim 5, wherein the treatment target water contains a substance to be removed selected from at least one of boron and urea.

8. The reverse osmosis membrane treatment method according to claim 5, wherein
- a pH adjuster is added to adjust the pH of the first permeated water in the first reverse osmosis membrane treatment device, and
- a degassing membrane device performs a degassing treatment to the first permeated water, and the degassing membrane device is positioned between the first reverse osmosis membrane and the second reverse osmosis membrane.

* * * * *